(12) United States Patent
McGonigal, Jr.

(10) Patent No.: US 6,401,380 B1
(45) Date of Patent: Jun. 11, 2002

(54) AUTOMATED JIGGING APPARATUS

(76) Inventor: Jacob H. McGonigal, Jr., 651 N. Johnson, Pocatello, ID (US) 83204

( * ) Notice: Subject to any disclaimer, the term of this patent is extended or adjusted under 35 U.S.C. 154(b) by 0 days.

(21) Appl. No.: 09/569,630

(22) Filed: May 12, 2000

(51) Int. Cl.[7] .............................................. A01K 97/10
(52) U.S. Cl. ...................................................... 43/19.2
(58) Field of Search ................................ 43/19.2, 26.1

(56) References Cited

U.S. PATENT DOCUMENTS

| | | | |
|---|---|---|---|
| 2,758,407 A | * | 8/1956 | Speidell ........................ 43/19.2 |
| 3,600,837 A | | 8/1971 | Bristol |
| 3,691,688 A | | 9/1972 | Strebig |
| 4,100,695 A | * | 7/1978 | Blanchard .................... 43/19.2 |
| 4,581,840 A | * | 4/1986 | Guith, II ...................... 43/21.2 |
| 4,597,215 A | * | 7/1986 | Otremba ...................... 43/19.2 |
| 4,603,499 A | * | 8/1986 | Simborski ................... 43/19.2 |
| 4,811,514 A | * | 3/1989 | Jordan ......................... 43/19.2 |
| 4,916,847 A | * | 4/1990 | Rusgo ......................... 43/19.2 |
| 4,932,151 A | * | 6/1990 | Cicha .......................... 43/19.2 |
| 4,951,411 A | | 8/1990 | Ecker |
| 5,119,580 A | | 6/1992 | Schulte et al. |
| D363,970 S | | 11/1995 | Cutshaw |
| 5,535,538 A | | 7/1996 | Heuke |
| 6,009,656 A | * | 1/2000 | Knepp ......................... 43/26.1 |

* cited by examiner

Primary Examiner—Kurt Rowan (57) ABSTRACT

A automated jigging apparatus for receiving and automatically jigging a fishing pole. The automated jigging apparatus includes a housing. A coupling means pivotally couples the fishing rod in a position generally above and to the housing. The coupling means includes a support means for supporting the fishing rod. The support means extends upwardly away from the housing. A receiving means receives the end of the fishing rod is rotatably mounted to the support means. An actuating assembly for jigging the receiving means includes a motor. The motor is adapted to rotate a gear. The gear is adapted to move an end of a rod up and down with respect to the base portion. The actuating assembly is generally positioned in a central portion of the housing. A Linking means links the rod to the receiving means.

21 Claims, 5 Drawing Sheets

AUTOMATED JIGGING APPARATUS

BACKGROUND OF THE INVENTION

1. Field of the Invention

The present invention relates to jigging devices and more particularly pertains to a new automated jigging apparatus for receiving and automatically jigging a fishing pole.

2. Description of the Prior Art

The use of jigging devices is known in the prior art. More specifically, jigging devices heretofore devised and utilized are known to consist basically of familiar, expected and obvious structural configurations, notwithstanding the myriad of designs encompassed by the crowded prior art which have been developed for the fulfillment of countless objectives and requirements Known prior art includes U.S. Pat. No. 4,951,411,U.S. Pat. No. 4,779,371; U.S. Pat. No. 5,437,121; U.S. Pat. No. 4,463,511; U.S. Pat. No. 4,811,514; and U.S. Des. Pat. No. 338,056.

While these devices fulfill their respective, particular objectives and requirements, the aforementioned patents do not disclose a new automated jigging apparatus. The inventive device includes a housing. A coupling means pivotally couples the fishing rod in a position generally above and to the housing. The coupling means includes a support means for supporting the fishing rod. The support means extends upwardly away from the housing. A receiving means receives the end of the fishing rod is rotatably mounted to the support means. An actuating assembly for jigging the receiving means includes a motor. The motor is adapted to rotate a gear. The gear is adapted to move an end of a rod up and down with respect to the base portion. The actuating assembly is generally positioned in a central portion of the housing. A linking means links the rod to the receiving means.

In these respects, the automated jigging apparatus according to the present invention substantially departs from the conventional concepts and designs of the prior art, and in so doing provides an apparatus primarily developed for the purpose of receiving and automatically jigging a fishing pole.

SUMMARY OF THE INVENTION

In view of the foregoing disadvantages inherent in the known types of jigging devices now present in the prior art, the present invention provides a new automated jigging apparatus construction wherein the same can be utilized for receiving and automatically jigging a fishing pole.

The general purpose of the present invention, which will be described subsequently in greater detail, is to provide a new automated jigging apparatus and method which has many of the advantages of the jigging devices mentioned heretofore and many novel features that result in a new automated jigging apparatus which is not anticipated, rendered obvious, suggested, or even implied by any of the prior art jigging devices, either alone or in any combination thereof.

To attain this, the present invention generally comprises a housing. A coupling means pivotally couples the fishing rod in a position generally above and to the housing. The coupling means includes a support means for supporting the fishing rod. The support means extends upwardly away from the housing. A receiving means receives the end of the fishing rod is rotatably mounted to the support means. An actuating assembly for jigging the receiving means includes a motor. The motor is adapted to rotate a gear. The gear is adapted to move an end of a rod up and down with respect to the base portion. The actuating assembly is generally positioned in a central portion of the housing. A linking means links the rod to the receiving means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automated jigging apparatus and method which has many of the advantages of the jigging devices mentioned heretofore and many novel features that result in a new automated jigging apparatus which is not anticipated, rendered obvious, suggested, or even implied by any of the prior art jigging devices, either alone or in any combination thereof.

It is another object of the present invention to provide a new automated jigging apparatus which may be easily and efficiently manufactured and marketed.

It is a further object of the present invention to provide a new automated jigging apparatus which is of a durable and reliable construction.

An even further object of the present invention is to provide a new automated jigging apparatus which is susceptible of a low cost of manufacture with regard to both materials and labor, and which accordingly is then susceptible of low prices of sale to the consuming public, thereby making such automated jigging apparatus economically available to the buying public.

Still yet another object of the present invention is to provide a new automated jigging apparatus which provides in the apparatuses and methods of the prior art some of the advantages thereof, while simultaneously overcoming some of the disadvantages normally associated therewith.

Still another object of the present invention is to provide a new automated jigging apparatus for receiving and automatically jigging a fishing pole.

Yet another object of the present invention is to provide a new automated jigging apparatus which includes a housing. A coupling means pivotally couples the fishing rod in a position generally above and to the housing. The coupling means includes a support means for supporting the fishing rod. The support means extends upwardly away from the housing. A receiving means receives the end of the fishing rod is rotatably mounted to the support means. An actuating assembly for jigging the receiving means includes a motor. The motor is adapted to rotate a gear. The gear is adapted to move an end of a rod up and down with respect to the base portion. The actuating assembly is generally positioned in a central portion of the housing. A linking means links the rod to the receiving means.

Still yet another object of the present invention is to provide a new automated jigging apparatus that may be used to lift and jerk the tip of a fishing pole while ice fishing.

Even still another object of the present invention is to provide a new automated jigging apparatus that contains dual actuating assemblies which have variable speeds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new automated jigging apparatus embodying the principles and concepts of the present invention and generally designated by the reference numeral 10 will be described.

As best illustrated in FIGS. 1 through 9, the automated jigging apparatus 10 generally comprises a housing 12. The housing 12 includes a base portion 13. The base portion 13 has a bottom wall 14 having a peripheral edge 15. A peripheral wall extends upwardly from and is integrally coupled to the peripheral edge 15. The peripheral wall comprises a front wall 17, a back wall 18, a first side wall 19 and a second side wall 20. A first dividing wall 21 extends between the front 17 and back 18 walls and is positioned generally adjacent to the first side wall 19. An area between the first dividing wall 21 and the first side wall 19 defines a battery compartment. A second dividing wall 22 extends between the front 17 and back 18 walls and is positioned generally adjacent to the second side wall 20. A plurality of spacing walls 23 extend between the second dividing wall 22 and the second side wall 20 such that a plurality of storage compartments are defined between the second dividing wall 22 and the second side wall 20. The storage compartments may be used for storing fishing tackle and other useful items. The bottom wall 14 generally has a rectangular shape.

A cover portion 25 comprises a plate 26. The plate 26 has a first edge 27, a second edge 28, a third edge 29 and a fourth edge 30. The first edge 27 is hingedly coupled by a plurality of hinges 32 to the first side wall 19 such that the second edge 28 may be abutted against the second side wall 20.

A fastening means removably fastens the second edge 28 of the plate 26 to the second side wall 20 of the base portion 13. The fastening means comprises a bore 33 in the second side wall 20, and an elongate member 34 fixedly coupled to a bottom surface of the plate 26. The elongate member 34 is positioned generally adjacent to the second edge 28. The bore 33. is positioned in a top edge of the second side wall 20 such that the bore 33 may receive the elongate member 34.

A coupling means pivotally couples the fishing rod in a position generally above the housing. The coupling means includes a support means 35 for supporting the fishing rod. The support means 35 comprises a base member 36 and two legs 37. The support means is a bracket, which is generally U-shaped. A shaft 38 extends between the two legs 37 and is generally nearer a free end of each of the legs 37.

Figure 1:
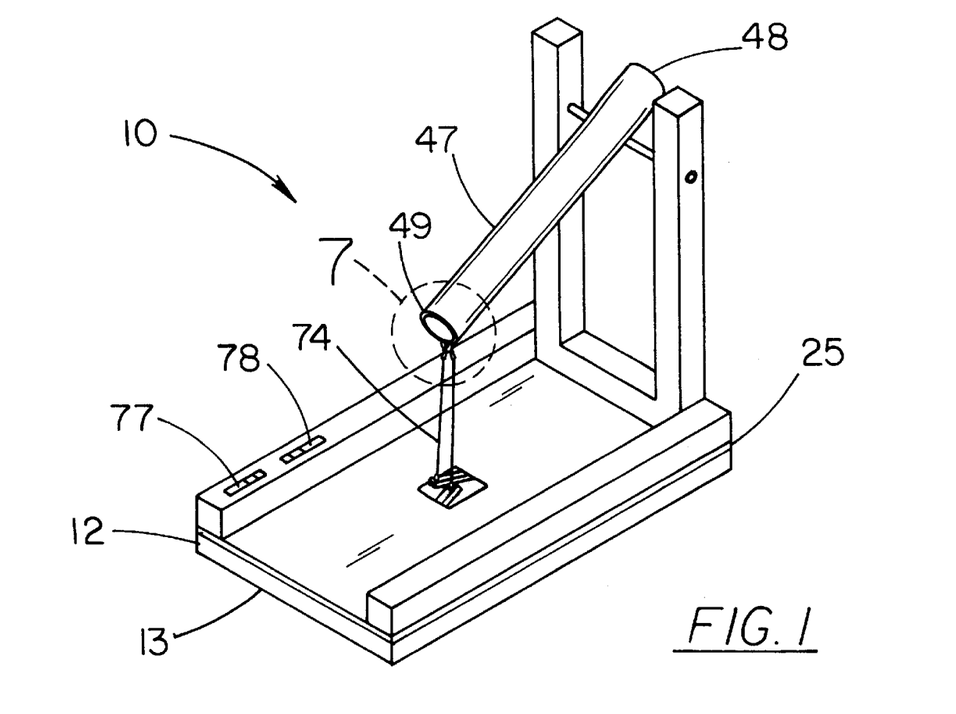
FIG. 1 is a schematic perspective view of a new automated jigging apparatus according to the present invention.
Figure 2:
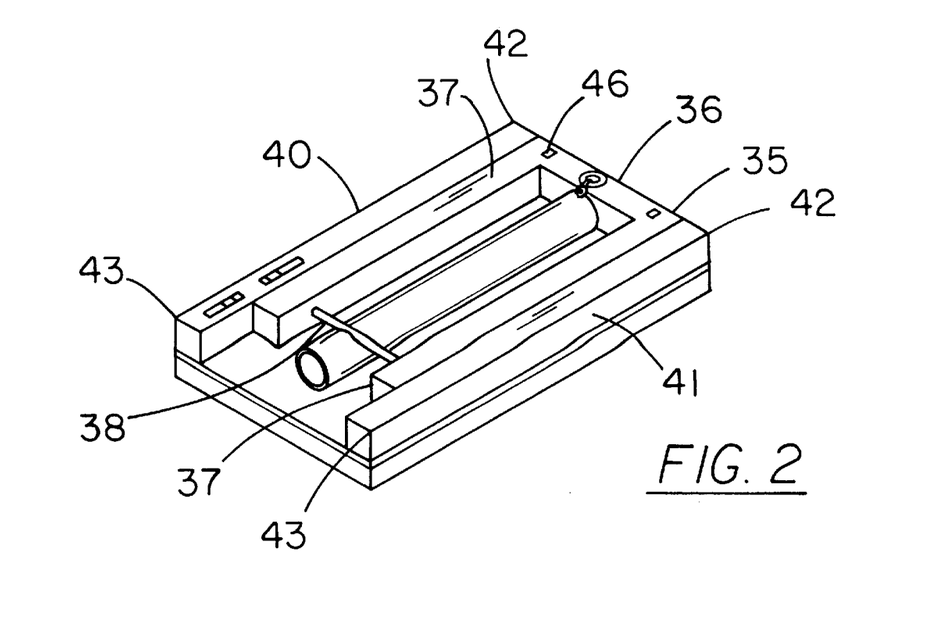
FIG. 2 is a schematic perspective view of the present invention.
Figure 3:
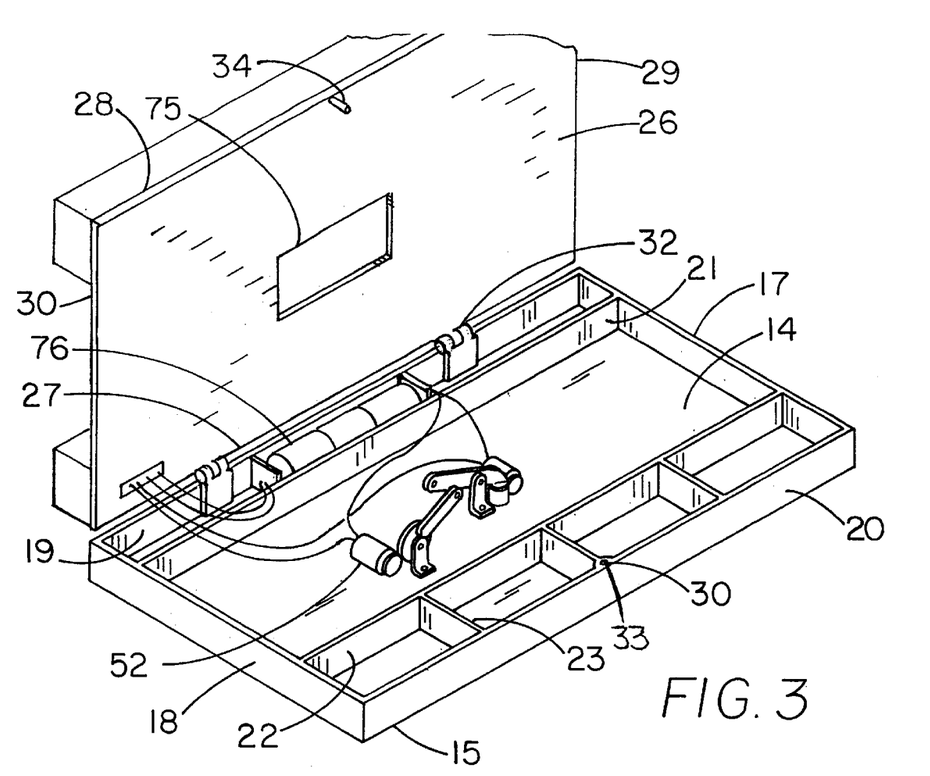
FIG. 3 is a schematic perspective view of the present invention.
Figure 4:
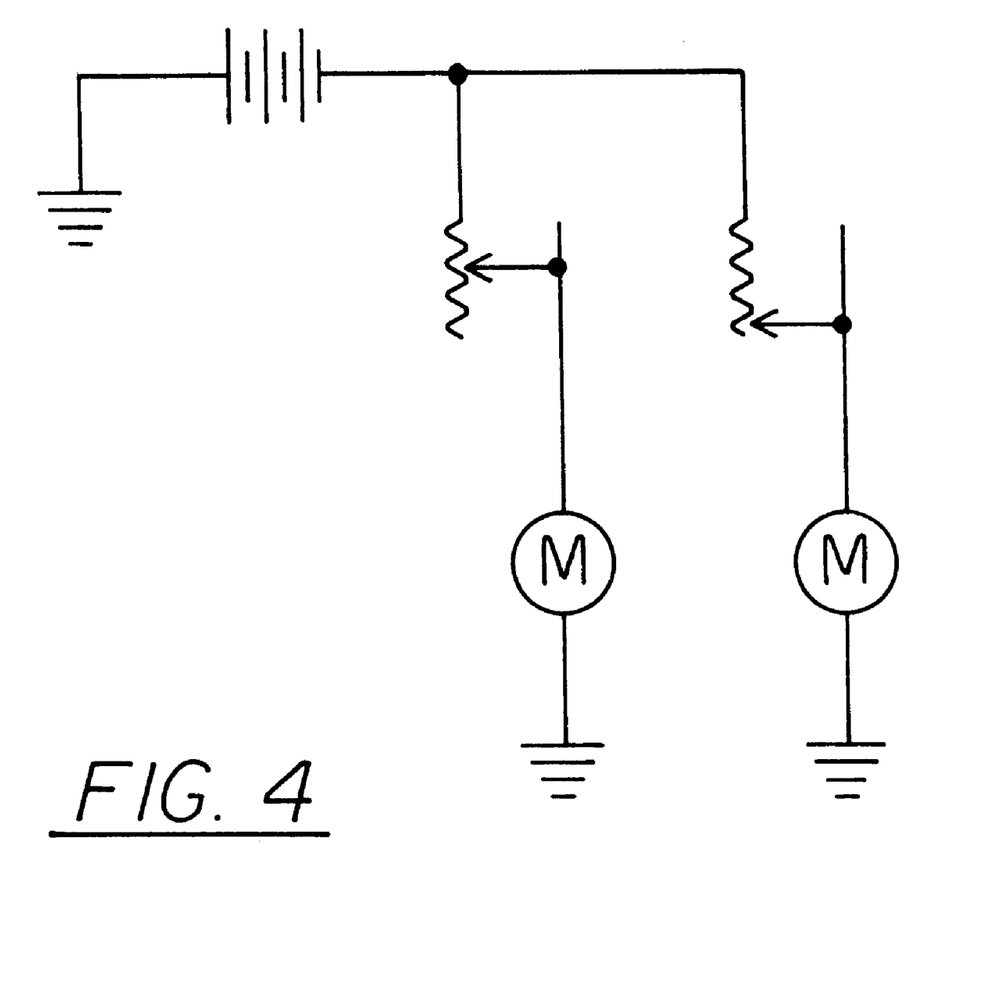
FIG. 4 is an electronic representation of the present invention.
Figure 5:
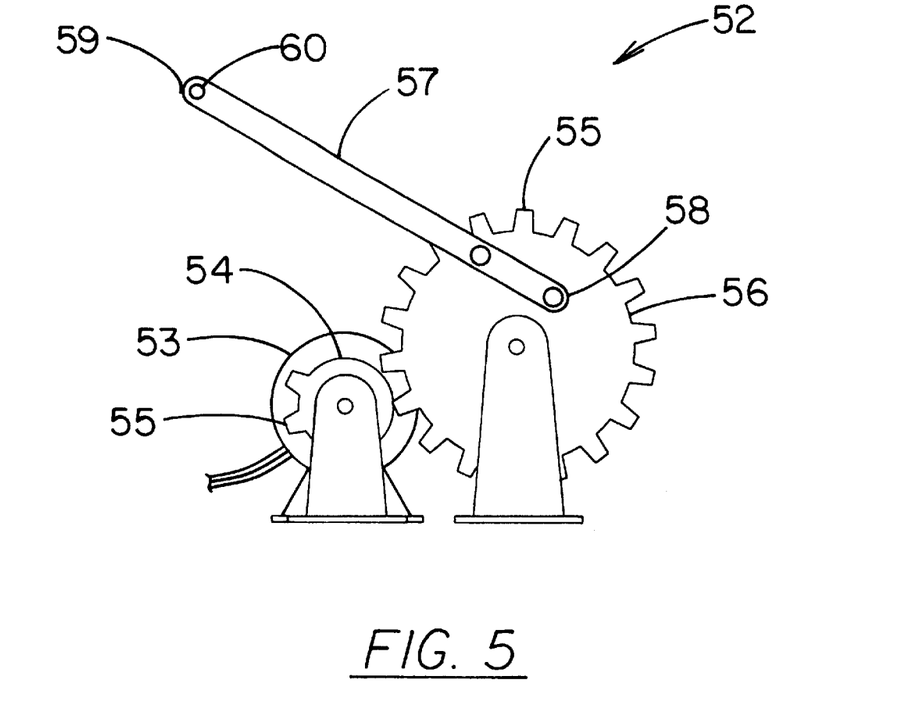
FIG. 5 is a schematic side view of the first actuating assembly of the present invention.
Figure 6:
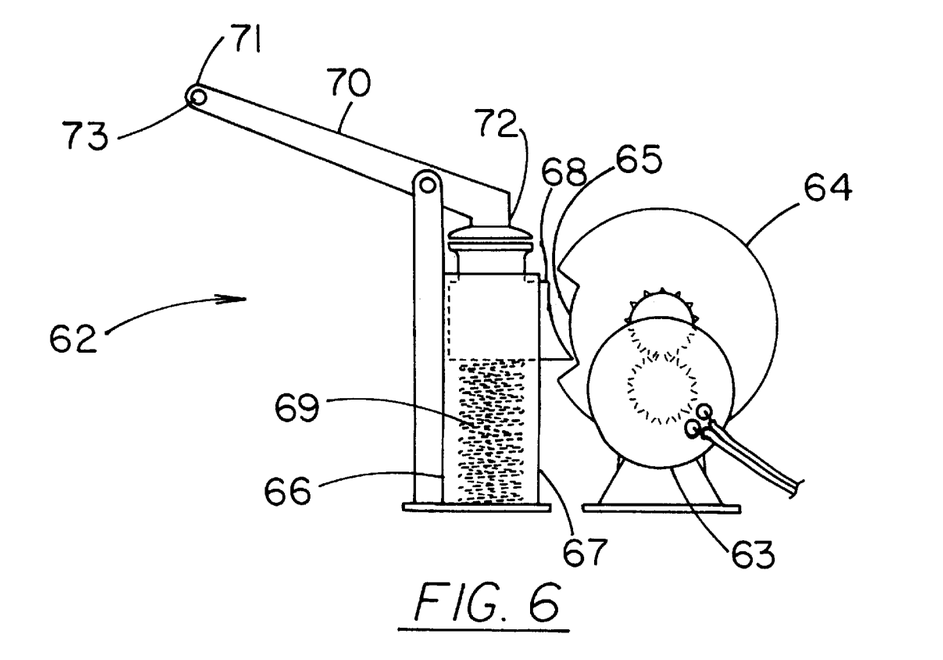
FIG. 6 is a schematic side view of the second actuating assembly of the present invention.
Figure 7:
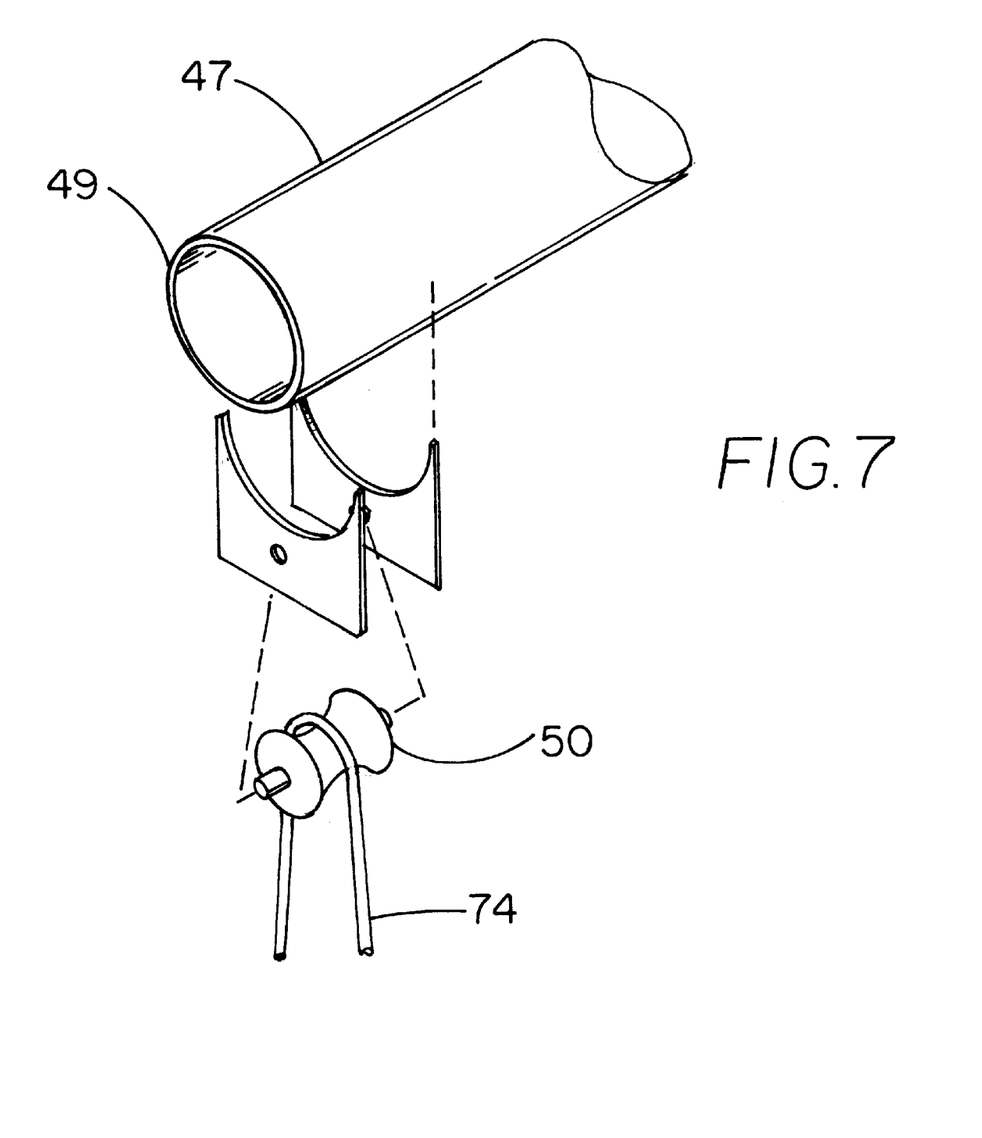
FIG. 7 is a schematic perspective view of the pulley wheel of the present invention.
Figure 8:
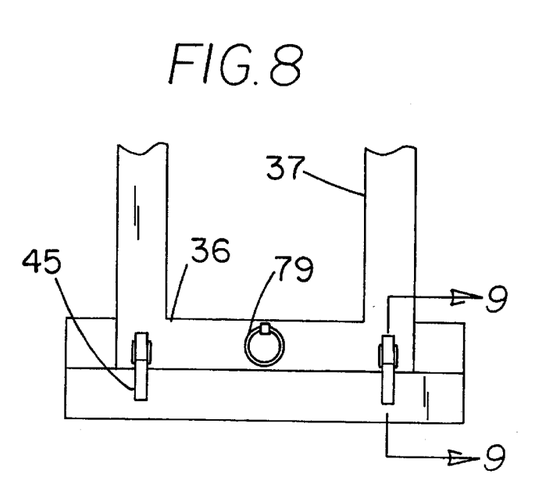
FIG. 8 is a schematic end view of the present invention.
Figure 9:
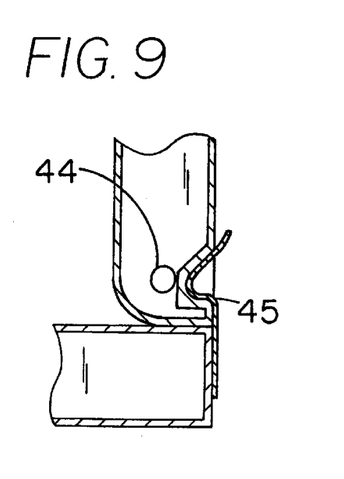
FIG. 9 is a schematic cross-sectional view taken alone line 9—9 of the present invention.

A hinging means hingedly couples the support means to the cover portion. The hinging means comprises a first elongate member 40 and a second elongate member 41. Each of the elongate members has a first end 42 and second end 43. Each of the elongate members 40, 41 is integrally coupled to a top surface of the plate 26. The first elongate member 40 is positioned generally abutted against the first edge 27 of the plate and the second elongate member 41 is generally abutted against the second edge 28 of the plate 26. Each of the first ends 42 of the first and second elongate members is abutted against the third edge 29 of the plate. The base member 36 of the bracket is positioned between the -elongate members 40, 41. An axle 44 runs through the base member 36 and rotatably couples each of the elongate members 40, 41 to an end of the base member 36. The base member 36 is generally adjacent to the second ends 43 of the elongate members 40, 41. The bracket 35 is selectively movable between a vertical position and a horizontal position. The horizontal position is shown in FIG. 2 and defines a storage position. The legs 37 extend away from the plate 26 in the vertical position. A pair of clasps 45 is fixedly coupled to the front wall 17 of the base portion 13 and each is adapted to removably secure the bracket 35 in the vertical position. Each of the clasps 45 is removably insertable in a slot 46 in the base member 35.

A receiving means 47 receives the end of the fishing rod. The receiving means 47 is rotatably mounted to the shaft 38. The receiving means 47 ideally comprises a tube. The tube 47 is substantially hollow and has a first 48 and second 49 end. The shaft 38 is positioned generally nearer the first end 48 of the tube. A pulley wheel 50 is rotatably mounted generally adjacent to the second end 49 of the tube 47.

A first actuating assembly 52 provides a relatively slow jigging movement respect to the support means. A jigging movement being defined as lifting and lowering the second end of the tube which will lift and lower the tip of a fishing rod when fishing. The first actuating assembly 52 includes a first motor 53. The first motor 53 is fixedly mounted to the top surface of the bottom wall 14.

A first gear 54 is coupled to the first motor 53 such that the first gear 54 is rotatable by the first motor 53. The first gear 54 has a peripheral edge having two generally adjacent teeth 55 thereon. However, one tooth could be used or a plurality of teeth as long as the teeth do not substantially encircle the first gear 54.

A second gear 56 is rotatably mounted to the top surface of the bottom wall 14. The second gear 56 has teeth 55 thereon. The second gear 56 is positioned such that the teeth 55 on the second gear 56 may communicate with the teeth 55 on the first gear 54.

A first rod 57 has a first end 58 fixedly coupled to the second gear 56, and a second end 59 extending to a location generally above a plane of the first gear 55. A bore 60 is in the first rod 57 and is generally located adjacent to the second end 59.

A second actuating assembly 62 provides a relatively quick, or jerky, jigging movement to the receiving means with respect to the support means. The second actuating assembly 62 includes a second motor 63. The second motor 63 is fixedly mounted to the top surface of the bottom wall 14.

A third gear 64 is mechanically coupled to the second motor 63 such that the third gear 64 is rotatable by the second motor 63. The third gear 64 has a peripheral edge having a depression therein 65.

A pole 66 is mounted next to the third gear 64. The pole 66 is generally hollow, and has a peripheral wall 67 having a slot therein. The pole 66 has a top edge having an aperture therein. A lever 68 is slidably mounted in the pole 66 such that the lever 68 protrudes from the slot. The pole 66 is fixedly mounted to the top surface of the bottom wall 14. The pole 66 is positioned such that a protruding portion of the lever 67 may extend through the slot and into the depression 65 in the third gear 64.

A biasing means 69 biases the lever 68 toward the aperture of the pole such that a portion of the lever extends through the aperture in the pole. Preferably, the biasing means is a spring.

A second rod 70, having a first end 71 and a second end 72, is pivotally coupled to a pillar 72 such that the second end 72 may be selectively abutted against a portion of the lever 68 extending through the aperture in the pole 66. The second rod 70 has a bore 73 therein generally positioned adjacent to the first end 71. The first 52 and second 62 actuating assemblies are generally positioned in a central portion of the bottom wall.

A linking means 74 links the first 57 and second 70 rods. The linking means 74 is a flexible elongate member having a first and second end. The first end is coupled to the bore 60 in the first rod 57 and the second end is coupled to the bore 73 in the second rod 70. The flexible elongate member extends around and through the pulley wheel 50. The plate 26 of the cover portion 25 has an opening 75 therein generally adjacent to the first 52 and second 62 actuating assemblies for passage of the linkage means 74. If only one of the actuating assemblies is used, the linking means 74 may be directly linked between the actuating assembly and the receiving member 47.

A power supply 76 powers the first 53 and second 63 motors. Ideally, the power supply 76 is a plurality of batteries mounted in the battery compartment although any conventional power supply could be utilized. The power supply 76 is operationally coupled to the first 53 and second 63 motors.

A first 77 and second 78 actuating switch turns the first 53 and second 63 motors on and off and are adapted for varying the speeds of the motors. Each of the actuating switches 77, 78 is mounted on a top surface of the first elongate member 40. Each of the actuating switches 77, 78 is operationally coupled to one of the first 53 and second 63 motors.

A ring 79 may be placed on the front wall 17 of the base portion 13 or on the base member 36. The fishing pole and the housing 12 may then be tied to an object via this ring to insure that the device is not pulled into the water after a fish bite.

In use, the handle of a fishing rod is placed in the receiving member such that the fishing rod extends away from the apparatus. The reel of the fishing rod will be beyond the shaft of the supporting means causing the tip of the pole to be biased toward the water by gravity. The rotation of the first gear rotates the second gear generally between 5 and 90 degrees. Since the first rod is coupled to the second rod, the linking means is drawn toward the first rod causing the second end of the receiving member to move toward the housing. When the teeth of the first gear are passed, gravity pulls on the tip of fishing rod causing the second end of the receiving means to move away from the housing.

For the second actuating assembly, the lever is moved away from the top edge of the pole by the third gear. The lever slides upward when the lever enters the depression on the third gear. The second end of the receiving means is pulled relatively quickly toward the bottom wall when the lever strikes the first end of the second rod. As with the first rod, gravity of the fishing pole forces the second rod back to its original place so that the lever may strike it again.

The first actuating assembly is a fluid up and down movement. The second actuating assembly causes a quick jerk on the fishing line as the receiver is moved quickly. The switches may be user for controlling the speeds of both of these movements.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A jigging apparatus for jigging a fishing rod, said apparatus comprising:

a housing, said housing including;

a base portion, said base portion having a bottom wall having a peripheral edge, a peripheral wall extending upwardly from and being integrally coupled to said peripheral edge, said peripheral wall comprising a front wall, a back wall, a first side wall and a second side wall;

a cover portion, said cover portion comprising a plate, said plate being hingedly coupled to said first side wall; and a fastening means for removably fastening a free edge of said plate to said second side wall of said base portion;

a coupling means for pivotally coupling the fishing rod in a position generally above and to said housing, said coupling means comprising;

a support means for supporting the fishing rod, said support means extending upwardly away from an outer surface of said plate;

a receiving means for receiving the end of the fishing rod being pivotally mounted to said support means;

an actuating assembly for jigging said receiving means, said actuating assembly being generally positioned mounted on said bottom wall and positioned in a central portion of said housing, said actuating assembly comprising:

a gear being adapted to move an end of the fishing rod up and down with respect to said base portion;

a motor being mechanically coupled to said gear and adapted to rotate said gear; and a linking means for linking said actuating assembly to said receiving means extending through an opening in said plate.

2. The jigging apparatus as in claim 1, wherein said support means comprises:

said support means comprising a bracket, said bracket having a base member and two legs, said bracket generally being U-shaped, a shaft extending between said two legs, said shaft being generally nearer a free end of each of said legs; and wherein said receiving member being rotatably coupled to said shaft.

3. The jigging apparatus as in claim 2, further including:

a hinging means for hingedly coupling said support means to said cover portion, said hinging means comprising a first elongate member and a second elongate member, each of said elongate members having a first and second ends, each of said elongate members being integrally coupled to a top surface of said plate, said first elongate member being positioned generally abutted against said first edge of said plate and said second elongate member abutted against said second edge of said plate, each of said first ends of said first and second elongate members being abutted against said third edge of said plate, said base member of said bracket being positioned between said elongate members, each of said elongate members being rotatably coupled to an end of said base member, a pair of clasps being fixedly coupled to said front wall of said base portion, said clasps being adapted to removably secure said bracket in a vertical position, each of said clasps being removably insertable in a slot in said base member.

4. The jigging apparatus as in claim 2, wherein said receiving means comprises:

said receiving means comprising a tube, said tube being substantially hollow, said tube having a first and second end, said shaft being positioned generally between said first and second ends.

5. The jigging apparatus as in claim 1, wherein said actuating assembly comprises:

a first gear being coupled to said motor such that said first gear is rotatable by said motor, said first gear having a peripheral edge having at least two generally adjacent teeth thereon;

a second gear, said second gear being rotatably mounted to said top surface of said bottom wall, said second gear having teeth thereon, said second gear being positioned such that said teeth on said second gear may communicate with said teeth on said first gear;

a rod, said rod having a first end being fixedly coupled to said second gear, said rod having a second end extending to a location above said first gear, a bore being in said rod generally located adjacent to said second end; and wherein said linking means being coupled to said bore in said rod.

6. The jigging apparatus as in claim 1, wherein said actuating assembly comprises:

said gear having a peripheral edge having a depression therein;

a pole, said pole being generally hollow, said pole having a peripheral wall having a slot therein, said pole having a top edge having an aperture therein, a lever being slidably mounted in said pole such that said lever protrudes from said slot, said pole being positioned such that a protruding portion of said lever may extend into said depression in said gear;

a biasing means for biasing said lever toward said aperture of said pole such that a portion of said lever extends through said aperture in said pole;

a rod, said rod having a first end and a second end, said rod being pivotally coupled to a pillar such that said second end may be selectively abutted against a portion of said lever extending through said aperture in said pole, said rod having a bore therein generally positioned adjacent to said first end; and wherein said linking means is coupled to said bore in said rod.

7. The jigging apparatus as in claim 1, wherein said actuating assembly comprises:

a first actuating assembly and a second actuating assembly, said first actuating assembly being adapted for relatively slow jigging of said receiving member, said second actuating assembly being adapted for relatively fast jigging of said receiving member;

a pulley being rotatably coupled to said receiving member; and said linking means having a first end coupled to said first actuating assembly and a second end being coupled to said second actuating assembly, said linking means being extended through said pulley.

8. The jigging apparatus as in claim 2, wherein said actuating assembly comprises:

a first actuating assembly and a second actuating assembly;

said a first actuating assembly being adapted for relatively slow jigging said receiving means with respect to said support means, said first actuating assembly comprising:

a first motor, said first motor being fixedly mounted to the top surface of said bottom wall;

a first gear being coupled to said first motor such that said first gear is rotatable by said first motor, said first gear having a peripheral edge having two generally adjacent teeth thereon; p2 a second gear, said second gear being rotatably mounted to said top surface of said bottom wall, said second gear having teeth thereon, said second gear being positioned such that said teeth on said second gear may communicate with said teeth on said first gear;

a first rod, said first rod having a first end being fixedly coupled to said second gear, said first rod having a second end extending to a location above said first gear, a bore being in said first rod generally located adjacent to said second end;

a second actuating assembly adapted for relatively quickly jigging said receiving means with respect to said support means, said second actuating assembly comprising:

a second motor, said second motor being fixedly mounted to the top surface of said bottom wall;

a third gear being mechanically coupled to said second motor such that said third gear is rotatable by said second motor, said third gear having a peripheral edge having a depression therein;

a pole, said pole being generally hollow, said pole having a peripheral wall having a slot therein, said pole having a top edge having an aperture therein, a lever being slidably mounted in said pole such that said lever protrudes from said slot, said pole being fixedly mounted to said top surface of said bottom wall, said pole being positioned such that a protruding portion of said lever may extend into said depression in said third gear;

a biasing means for biasing said lever toward said aperture of said pole such that a portion of said lever extends through said aperture in said pole, said biasing means being a spring;

a second rod, said second rod having a first end and a second end, said rod being pivotally coupled to a pillar such that said second end may be selectively abutted against a portion of said lever extending through said aperture in said pole, said second rod having a bore therein generally positioned adjacent to said first end;

said linking means linking said first and second rods, said linking means extending about a pulley rotatably coupled to said receiving member, said cover portion having an opening therein generally adjacent to said first and second actuating assemblies for passage of said linkage means.

9. The jigging apparatus as in claim 8, a first and second actuating switch for turning said first and second motors on and off and being adapted for varying the speeds of said motors, each of said actuating switches being mounted on said cover portion, each of said actuating switches being operationally coupled to one of the first and second motors.

10. A jigging apparatus for jigging a fishing rod, said apparatus comprising:

a housing, said housing comprising:

a base portion, said base portion having a bottom wall having a peripheral edge, a peripheral wall extending upwardly from and being integrally coupled to said peripheral edge, said peripheral wall comprising a front wall, a back wall, a first side wall and a second side wall, a first dividing wall extending between said front and back walls and being positioned generally adjacent to said first side wall, an area between said first dividing wall and said first side wall defining a battery compartment, a second dividing wall extending between said front and back walls and positioned generally adjacent to said second side wall, a plurality of spacing walls extending between said second dividing wall and said second side wall such that a plurality of storage compartments are defined between said second dividing wall and said second side wall, said bottom wall generally having a rectangular shape;

a cover portion, said cover portion comprising a plate, said plate having a first edge, a second edge, a third edge and a fourth edge, said first edge being hingedly coupled to said first side wall such that said second edge may be abutted against said second side wall;

a fastening means for removably fastening said second edge of said plate to said second side wall of said base portion, said fastening means comprising a bore in said second side wall and an elongate member fixedly coupled to a bottom surface of said plate, said elongate member being positioned generally adjacent to said second edge, said bore being positioned in a top edge of said second side wall such that said bore may receive said elongate member;

a coupling means for pivotally coupling the fishing rod in a position generally above said housing, said coupling means comprising:

a support means for supporting the fishing rod, said support means comprising a bracket, said bracket having a base portion and two legs, said bracket generally being U-shaped, a shaft extending between said two legs, said shaft being generally nearer a free end of each of said legs;

a hinging means for hingedly coupling said support means to said cover portion, said hinging means comprising a first elongate member and a second elongate member, each of said elongate members having a first and second ends, each of said elongate members being integrally coupled to a top surface of said plate, said first elongate member being positioned generally abutted against said first edge of said plate and said second elongate member abutted against said second edge of said plate, each of said first ends of said first and second elongate members being abutted against said third edge of said plate, said base portion of said bracket being positioned between said elongate members, each of said elongate members being rotatably coupled to an end of said base member, said base member being generally adjacent to said second ends of said elongate members, said bracket being selectively movable between a vertical position and a horizontal position, said legs extending away from said plate in said vertical position, a pair of clasps being fixedly coupled to said front wall of said base portion being adapted to removably secure said bracket in said vertical position, each of said clasps being removably insertable in a slot in said base member;

a receiving means for receiving the end of the fishing rod, said receiving means being rotatably mounted to said shaft, said receiving means comprising a tube, said tube being substantially hollow, said tube having a first and second end, said shaft being positioned generally nearer said first end, a pulley wheel being rotatably mounted generally adjacent to said second end of said tube;

a first actuating assembly for relatively slow jigging said receiving means with respect to said support means, said first actuating assembly comprising:
a first motor, said first motor being fixedly mounted to the top surface of said bottom wall;
a first gear being coupled to said first motor such that said first gear is rotatable by said first motor, said first gear having a peripheral edge having two generally adjacent teeth thereon;
a second gear, said second gear being rotatably mounted to said top surface of said bottom wall, said second gear having teeth thereon, said second gear being positioned such that said teeth on said second gear may communicate with said teeth on said first gear;
a first rod, said first rod having a first end being fixedly coupled to said second gear, said first rod having a second end extending to a location above said first gear, a bore being in said first rod generally located adjacent to said second end;

a second actuating assembly for relatively quickly jigging said receiving means with respect to said support means, said second actuating assembly comprising:
a second motor, said second motor being fixedly mounted to the top surface of said bottom wall;
a third gear being mechanically coupled to said second motor such that said third gear is rotatable by said second motor, said third gear having a peripheral edge having a depression therein;
a pole, said pole being generally hollow, said pole having a peripheral wall having a slot therein, said pole having a top edge having an aperture therein, a lever being slidably mounted in said pole such that said lever protrudes from said slot, said pole being fixedly mounted to said top surface of said bottom wall, said pole being positioned such that a protruding portion of said lever may extend through said slot and into said depression in said third gear;
a biasing means for biasing said lever toward said aperture of said pole such that a portion of said lever extends through said aperture in said pole, said biasing means being a spring;
a second rod, said second rod having a first end and a second end, said second rod being pivotally coupled to a pillar such that said second end may be selectively abutted against a portion of said lever extending through said aperture in said pole, said second rod having a bore therein generally positioned adjacent to said first end;
wherein said first and second actuating assemblies are generally positioned in a central portion of said bottom wall;

a linking means for linking said first and second rods, said linking means being a flexible elongate member having a first and second end, said first end being coupled to said bore in said first rod and said second end being coupled to said bore in said second rod, said flexible elongate member extending around said pulley wheel, said cover portion having an opening therein generally adjacent to said first and second actuating assemblies for passage of said linkage means;

a power supply for powering said first and second motors, said power supply being a plurality of batteries mounted in said battery compartment, said power supply being operationally coupled to said first and second motors; and a first and second actuating switch for turning said first and second motors on and off and being adapted for varying the speeds of said motors, each of said actuating switches being mounted on a top surface of said first elongate member, each of said actuating switches being operationally coupled to one of the first and second motors.

11. A jigging apparatus for jigging a fishing rod, said apparatus comprising:
a housing;
a coupling means for pivotally coupling the fishing rod in a position generally above and to said housing, said coupling means comprising;
a support means for supporting the fishing rod, said support means extending upwardly away from said housing;
a receiving means for receiving the end of the fishing rod being pivotally mounted to said support means;
an actuating assembly for jigging said receiving means, said actuating assembly comprising;
a motor;
a gear being mechanically coupled to said motor such that said gear is rotatable by said motor, said gear having a peripheral edge having a depression therein;
a pole, said pole being generally hollow, said pole having a peripheral wall having a slot therein, said pole having a top edge having an aperture therein, a lever being slidably mounted in said pole such that said lever protrudes from said slot, said pole being positioned such that a protruding portion of said lever may extend into said depression in said gear;
a biasing means for biasing said lever toward said aperture of said pole such that a portion of said lever extends through said aperture in said pole;
a rod, said rod having a first end and a second end, said rod being pivotally coupled to a pillar such that said second end may be selectively abutted against a portion of said lever extending through said aperture in said pole, said rod having a bore therein generally positioned adjacent to said first end; and
a linking means for linking said actuating assembly to said receiving means; wherein said linking means is coupled to said bore in said rod.

12. The jigging apparatus as in claim 11, wherein said housing comprises:
a base portion having a bottom wall having a peripheral edge, a peripheral wall extending upwardly from and integrally coupled to said peripheral edge, said peripheral wall comprising a front wall, a back wall, a first side wall and a second side wall, a first dividing wall extending between said front and back walls and positioned generally adjacent to said first side wall;
a cover portion comprising a plate having a first edge, a second edge, a third edge and a fourth edge, said first edge being hingedly coupled to said first side wall such that said second edge may be abutted against said second side wall, said actuating assembly being mounted on said bottom wall, said over portion having an opening therein for passage of said linking means.

13. The jigging apparatus as in claim 12, wherein said housing further includes a fastening means for removably fastening said second edge of said plate to said second side wall of said base portion.

14. The jigging apparatus as in claim 13, wherein said fastening means comprises a bore in said second side wall and an elongate member fixedly coupled to a bottom surface of said plate, said elongate member being positioned generally adjacent to said second edge, said bore being positioned in a top edge of said second side wall such that said bore may receive said elongate member.

15. The jigging apparatus as in claim 12, wherein an area between said first dividing wall and said first side wall defining a battery compartment, a power source is operationally coupled to said motor, said power source being removably mounted in said battery compartment.

16. A jigging apparatus for jigging a fishing rod, said apparatus comprising:
   a housing;
   a coupling means for pivotally coupling the fishing rod in a position generally above and to said housing, said coupling means comprising;
      a support means for supporting the fishing rod, said support means extending upwardly away from said housing;
   a receiving member for receiving the end of the fishing rod being pivotally mounted to said support means;
   a first actuating assembly and a second actuating assembly, said first actuating assembly being adapted for relatively slow jigging of said receiving member, said second actuating assembly being adapted for relatively fast jigging of said receiving member;
   a pulley being rotatably coupled to said receiving member; and
   a linking means for linking said actuating assemblies to said receiving member, said linking means having a first end coupled to said first actuating assembly and a second end being coupled to said second actuating assembly, said linking means being extended through said pulley.

17. The jigging apparatus as in claim 16, wherein said actuating assembly comprises:
   said first actuating assembly comprising; a
      a first motor being mounted on the housing;
      a first gear being coupled to said first motor such that said first gear is rotatable by said first motor, said first gear having a peripheral edge having two generally adjacent teeth thereon;
      a second gear being rotatably mounted on said housing, said second gear having teeth thereon, said second gear being positioned such that said teeth on said second gear may communicate with said teeth on said first gear;
      a first rod having a first end being fixedly coupled-to said second gear, said first rod having a second end extending to a location above said first gear, a bore being in said first rod generally located adjacent to said second end;
   said second actuating assembly comprising;
      a second motor being mounted on the housing;
      a third gear being mechanically coupled to said second motor such that said third gear is rotatable by said second motor, said third gear having a peripheral edge having a depression therein;
      a pole, said pole being generally hollow, said pole having a peripheral wall having a slot therein, said pole having a top edge having an aperture therein, a lever being extendably mounted in said pole such that said lever protrudes from said slot, said pole being mounted to the housing, said pole being positioned such that a protruding portion of said lever may extend into said depression in said third gear;
      a biasing means for biasing said lever toward said aperture of said pole such that a portion of said lever extends through said aperture in said pole, said biasing means being a spring;
      a second rod having a first end and a second end, said rod being pivotally coupled to a pillar such that said second end may be selectively abutted against a portion of said lever extending through said aperture in said pole, said second rod having a bore therein generally positioned adjacent to said first end;
   said linking means linking said first and second rods, said linking means extending about a pulley rotatably coupled to said receiving member, said cover portion having an opening therein generally adjacent to said first and second actuating assemblies for passage of said linkage means.

18. The jigging apparatus as in claim 16, wherein said housing comprises:
   a base portion having a bottom wall having a peripheral edge, a peripheral wall extending upwardly from and integrally coupled to said peripheral edge, said peripheral wall comprising a front wall, a back wall, a first side wall and a second side wall, a first dividing wall extending between said front and back walls and positioned generally adjacent to said first side wall;
   a cover portion comprising a plate having a first edge, a second edge, a third edge and a fourth edge, said first edge being hingedly coupled to said first side wall such that said second edge may be abutted against said second side wall, said first and second actuating assemblies being mounted on said bottom wall, said over portion having an opening therein for passage of said linking means.

19. The jigging apparatus as in claim 18, wherein said housing further includes a fastening means for removably fastening said second edge of said plate to said second side wall of said base portion.

20. The jigging apparatus as in claim 18, wherein an area between said first dividing wall and said first side wall defining a battery compartment, a power source is operationally coupled to said motor, said power source being removably mounted in said battery compartment.

21. The jigging apparatus as in claim 1, further comprising:
   a housing, said housing comprising:
      said base portion including a first dividing wall extending between said front and back walls and being positioned generally adjacent to said first side wall, an area between said first dividing wall and said first side wall defining a battery compartment, a second dividing wall extending between said front and back walls and positioned generally adjacent to said second side wall, a plurality of spacing walls extending between said second dividing wall and said second side wall such that a plurality of storage compartments are defined between said second dividing wall and said second side wall, said bottom wall generally having a rectangular shape;
      said plate having a first edge, a second edge, a third edge and a fourth edge, said first edge being hingedly coupled to said first side wall such that said second edge may be abutted against said second side wall;

said fastening means comprising a bore in said second side wall and an elongate member fixedly coupled to a bottom surface of said plate, said elongate member being positioned generally adjacent to said second edge, said bore being positioned in a top edge of said second side wall such that said bore may receive said elongate member;

coupling means further comprising:

said support means comprising a bracket, said bracket having a base member and two legs, said bracket generally being U-shaped, a shaft extending between said two legs, said shaft being generally nearer a free end of each of said legs;

a hinging means for hingedly coupling said support means to said cover portion, said hinging means comprising a first elongate member and a second elongate member, each of said elongate members having a first and second ends, each of said elongate members being integrally coupled to a top surface of said plate, said first elongate member being positioned generally abutted against said first edge of said plate and said second elongate member abutted against said second edge of said plate, each of said first ends of said first and second elongate members being abutted against said third edge of said plate, said base member of said bracket being positioned between said elongate members, each of said elongate members being rotatably coupled to an end of said base member, said base member being generally adjacent to said second ends of said elongate members, said bracket being selectively movable between a vertical position and a horizontal position, said legs extending away from said plate in said vertical position, a pair of clasps being fixedly coupled to said front wall of said base portion being adapted to removably secure said bracket in said vertical position, each of said clasps being removably insertable in a slot in said base member;

said receiving means being rotatably mounted to said shaft, said receiving means comprising a tube, said tube being substantially hollow, said tube having a first and second end, said shaft being positioned generally nearer said first end, a pulley wheel being rotatably mounted generally adjacent to said second end of said tube;

said actuating means including a first actuating means and a second actuating means, said first actuating assembly being adapted for relatively slow jigging said receiving means with respect to said support means, said first actuating assembly comprising:

a first motor, said first motor being fixedly mounted to the top surface of said bottom wall;

a first gear being coupled to said first motor such that said first gear is rotatable by said first motor, said first gear having a peripheral edge having two generally adjacent teeth thereon;

a second gear, said second gear being rotatably mounted to said top surface of said bottom wall, said second gear having teeth thereon, said second gear being positioned such that said teeth on said second gear may communicate with said teeth on said first gear;

a first rod, said first rod having a first end being fixedly coupled to said second gear, said first rod having a second end extending to a location above said first gear, a bore being in said first rod generally located adjacent to said second end;

said second actuating assembly being adapted for relatively quickly jigging said receiving means with respect to said support means, said second actuating assembly comprising:

a second motor, said second motor being fixedly mounted to the top surface of said bottom wall;

a third gear being mechanically coupled to said second motor such that said third gear is rotatable by said second motor, said third gear having a peripheral edge having a depression therein;

a pole, said pole being generally hollow, said pole having a peripheral wall having a slot therein, said pole having a top edge having an aperture therein, a lever being slidably mounted in said pole such that said lever protrudes from said slot, said pole, being fixedly mounted to said top surface of said bottom wall, said pole being positioned such that a protruding portion of said lever may extend through said slot and into said depression in said third gear;

a biasing means for biasing said lever toward said aperture of said pole such that a portion of said lever extends through said aperture in said pole, said biasing means being a spring;

a second rod, said second rod having a first end and a second end, said second rod being pivotally coupled to a pillar such that said second end may be selectively abutted against a portion of said lever extending through said aperture in said pole, said second rod having a bore therein generally positioned adjacent to said first end;

wherein said first and second actuating assemblies are generally positioned in a central portion of said bottom wall;

said linking means linking said first and second rods, said linking means being a flexible elongate member having a first and second end, said first end being coupled to said bore in said first rod and said second end being coupled to said bore in said second rod, said flexible elongate member extending around said pulley wheel, said cover portion having an opening therein generally adjacent to said first and second actuating assemblies for passage of said linkage means;

a power supply for powering said first and second motors, said power supply being a plurality of batteries mounted in said battery compartment, said power supply being operationally coupled to said first and second motors; and a first and second actuating switch for turning said first and second motors on and off and being adapted for varying the speeds of said motors, each of said actuating switches being mounted on a top surface of said first elongate member, each of said actuating switches being operationally coupled to one of the first and second motors.

* * * * *